(12) United States Patent
Kawashima (10) Patent No.: US 6,721,963 B1
(45) Date of Patent: Apr. 20, 2004

(54) SWIMMING GOGGLE (75) Inventor: Haruo Kawashima, Tokyo (JP)

(73) Assignee: Tabata Co., Ltd., Tokyo (JP)

( * ) Notice: Subject to any disclaimer, the term of this patent is extended or adjusted under 35 U.S.C. 154(b) by 0 days.

(21) Appl. No.: 10/149,282

(22) PCT Filed: Oct. 13, 2000

(86) PCT No.: PCT/JP00/07137

§ 371 (c)(1),
(2), (4) Date: Jun. 11, 2002

(87) PCT Pub. No.: WO02/32510

PCT Pub. Date: Apr. 25, 2002

(51) Int. Cl.[7] ................................................. A61F 9/02
(52) U.S. Cl. ................................... 2/426; 2/445; 2/446
(58) Field of Search ........................ 2/12, 13, 15, 426, 2/428, 440, 442, 446, 445

(56) References Cited

U.S. PATENT DOCUMENTS

| | | | | |
|---|---|---|---|---|
| 4,989,274 A | * | 2/1991 | Patelski, III | 2/436 |
| 5,093,940 A | * | 3/1992 | Nishiyama | 2/441 |
| 5,524,300 A | | 6/1996 | Chiang | |
| 5,802,620 A | * | 9/1998 | Chiang | 2/428 |
| 5,829,064 A | | 11/1998 | Huang | |
| 5,894,606 A | * | 4/1999 | Chiang | 2/440 |
| 6,023,791 A | * | 2/2000 | Chiang | 2/441 |
| 6,029,284 A | | 2/2000 | Kawashima et al. | |
| 6,070,272 A | * | 6/2000 | Chiang | 2/442 |
| 6,098,206 A | * | 8/2000 | Chou | 2/428 |
| 6,119,278 A | * | 9/2000 | Kawashima | 2/428 |
| 6,138,286 A | * | 10/2000 | Robrahn et al. | 2/436 |
| 6,151,720 A | * | 11/2000 | Chiang | 2/428 |
| 6,253,387 B1 | * | 7/2001 | Yu | 2/428 |
| 6,317,897 B1 | * | 11/2001 | Chiang | 2/428 |

FOREIGN PATENT DOCUMENTS

| | | |
|---|---|---|
| JP | 3038537 | 4/1997 |
| JP | 10-211299 | 8/1998 |

* cited by examiner

*Primary Examiner*—Gary L. Welch
(74) *Attorney, Agent, or Firm*—Clark & Brody (57) ABSTRACT

A pair of lens frames 11 being more soft and flexible than a pair of lenses 10 include annular lens holders 15 to hold the lenses 10, gasket skirts 16 extending from rear edges of the lens holders 15 and a bridge 17 to connect the lens holders 15 to each other. The bridge 17 has a gradient in flexibility increasing from a middle zone of the bridge 17 bisecting the length of the bridge 17 toward the respective lens holders 15.

9 Claims, 8 Drawing Sheets

SWIMMING GOGGLE

TECHNICAL FIELD OF THE INVENTION

This invention relates to swimming goggles and more particularly to swimming goggles having a bridge means connected between a pair of lens holders opposed to and spaced from each other so as to form a part of lens frames.

DESCRIPTION OF THE RELATED ART

Swimming goggles are usually provided with a bridge connected between a pair of lens holders opposed to and spaced from each other so as to form a part of the lens frames. One of the conventional bridges is made from a flexible material in a flat belt-like shape adapted to be freely deformed following an individual wearer and thereby to avoid feeling incompatible feeling as it comes in contact with the wearer's nose. Another bridge of well known art is previously shaped so as to be curved forward with respect to the face of the goggle wearer. One example of the flat belt-shaped bridge is that of the swimming goggles disclosed in U.S. Pat. No. 5,524,300 (referred to hereinafter as a first goggles of prior art) and one example of the curving forward bridge is that of the swimming goggles disclosed in U.S. Pat. No. 5,829,064 (referred to hereinafter as a second goggles of prior art).

Figure 6:
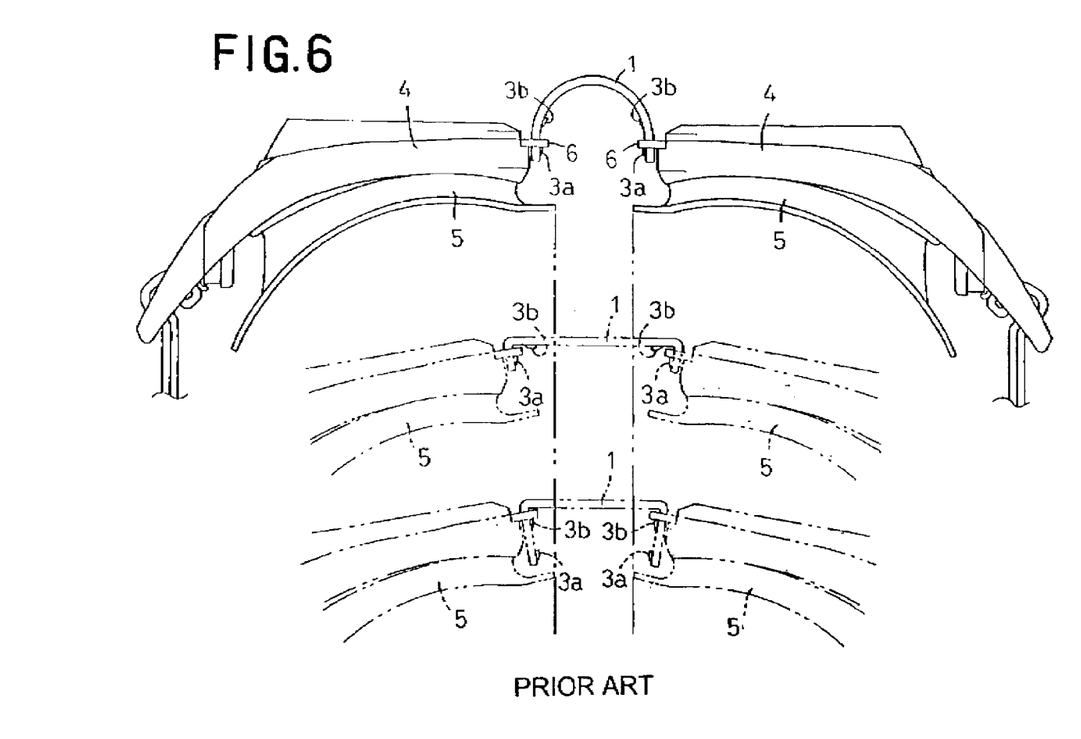
FIG. 6 is a schematic plan view showing the swimming goggles of prior art and a situation in which the lens frames inclusive of the bridge may get out from proper position depending on the manner in which the lens frames are put on the wearer's face.

FIG. 6 of the accompanying drawings is a schematic plan view showing the first goggles of prior art. Referring to FIG. 6, a bridge 1 is formed on its rear surface with a plurality of stopper projections 3a, 3b spaced one from another in a longitudinal direction of the bridge 1. These stopper projections 3a, 3b may be selectively engaged with a pair of connector pieces 6 extending inward from opposite inner side edges of the respective lens holders 4 to connect the bridge 1 to the respective lens holders 4. A distance between the lens holders 4 can be adjusted by changing over positions of each pair of the stopper projections 3a, 3b one from another.

Solid lines on upper part of FIG. 6 shows the bridge 1 as the swimming goggles are properly worn by the swimmer. In this state, the bridge 1 is curved along an upper edge contour of the wearer's nose and gasket skirts 5 associated with the respective lens holders 4 also are placed closely against peripheral regions (not shown) of the wearer's eyes.

However, the face is different with respect to its shape as well as its size for each wearer and, depending on the shape of the wearer's face, there may occur a case in which the left lens holder 4 is displaced to a counterclockwise direction while the right lens holder 4 is displaced to a clockwise direction about the wearer's nose as viewed in FIG. 6 and the bridge 1 is deformed until it is substantially flattened. In such case, pressure with which the goggles should be tightly pressed against the wearer's face may be slackened and consequently the tightness with which gasket skirts 5 thereof should be pressed against the wearer's face in the peripheral regions of the wearer's eyes, particularly in the vicinity of inner eye corners is reduced. Thus inside of the goggles may often be filled with water flown into from apertures in the peripheral regions of the wearer's eyes.

Such problem is primarily due to the fact that flexibility of the bridge 1 is uniform over the entire region of the bridge 1 and excessively high.

With the goggles of prior art shown in FIG. 6, the wearer is required to undertake a troublesome adjustment, for instance, to move by sliding the bridge 1 from a position defined by a stopper projection 3a to a position defined by a stopper projection 3b so as to reduce the distance between the opposite lens holders 4 as indicated on a lower part of FIG. 6 by chain lines.

Though not shown, the second goggles of prior art is characterized in that the bridge has a cross-section smaller in its intermediate region extending between the opposite lens holders than in its regions adjacent to the respective lens holder. More specifically, the cross-section of the bridge 1 is gradually enlarged from its intermediate region toward the respective lens holders so that flexibility of the bridge 1 is gradually decreased from the intermediate region toward the respective lens holders.

With the goggles having such bridge configuration, the bridge is deformed more easily in its intermediate region than in the remaining regions and it is difficult for these goggles to ensure a desired self-shape-retention. In other words, the curve of its initial shape is apt to be largely straightened.

Thus, the second goggles of prior art may have the problem similar to the problem accompanying the first goggles of prior art.

It is an object of this invention to solve the problem by a relatively simple means.

SUMMARY OF THE INVENTION

According to this invention, there are provided swimming goggles basically comprising a pair of lenses and a pair of lens frames being more soft and flexible than said pair of lenses, the lens frames including annular lens holders to hold the lenses and gasket skirts extending from rear edges of the lens holders, and further comprising a connector member extending between the lens holders to connect the lens holders to each other.

The connector member is provided in a form of a bridge extending between the lens holders and having intermediate regions extending between the lens holders and opposite end regions defined between the intermediate region and respective lens holders wherein the bridge has a flexibility lower in the intermediate region than in the opposite end regions.

In addition to the basic configuration as has been described above, this invention may be implemented in other manners as follow. For example, the bridge has a gradient in flexibility increasing from a middle zone of the bridge bisecting the length of the bridge toward respective lens holders.

In another preferred embodiment of this invention, the gradient in flexibility of the bridge is defined by a cross-sectional shape and/or a cross-sectional area of the bridge.

In still another preferred embodiment of this invention, the bridge is curved in a convexed shape to the front of a goggles wearer's face.

In further another preferred embodiment of this invention, the bridge is formed integrally with the lens frames using the same flexible material as the material of the lens frames.

In an additional preferred embodiment of this invention, the bridge is formed by a flexible material different from the material for the lens holders and coupled at opposite ends of the bridge to the lens holders.

An alternative embodiment is also possible, in which the lens frames inclusive of the bridge are formed by rubber or plastic elastomer.

Finally, it is also possible to implement this invention in a manner such that each of the lens is formed in a shape of a cup provided on its peripheral walls with at least one rib, on one hand, and each of the lens holders is provided on its inner peripheral wall with a groove so that the rib may be water-tightly engaged with the groove.

It will be obviously understood that the swimming goggles according to this invention are added with a head strap detachably connected to the opposite outer sides of the respective lens frames when the swimming goggles are supplied as the complete swimming goggles which can be practically used by the swimmer.

With the swimming goggles according to this invention, the intermediate region of the bridge less flexible than the remaining region acts to retain stably its initial shape of the curve due to a given self-shape-retaining property during use of the goggles regardless of differences in shape as well as in size of the face of an individual wearer. The opposite end regions of the bridge having relatively high flexibility are appropriately deformed in conformity with a contour of the face of the individual wearer.

It should be noted that there is no possibility that the difference between the lens holders might be enlarged as the opposite end regions of the bridge are deformed in conformity with a shape and a size of the individual wearer's face.

Therefore, the gasket skirts associated with the respective lens holders can be stably and water-tightly contacted with the regions around the wearer's eyes.

In this way, it is unnecessary for the swimming goggles according to this invention to include an arrangement such that the bridge is slidably moved and engaged with the lens holders to adjust the distance between the lens holders depending on the size of the individual wearer's face as the conventional swimming goggles have been the case.

PREFERRED EMBODIMENTS OF THE INVENTION

Specific embodiments of swimming goggles according to this invention will be described more in details in reference to the accompanying drawings.

Figure 1:
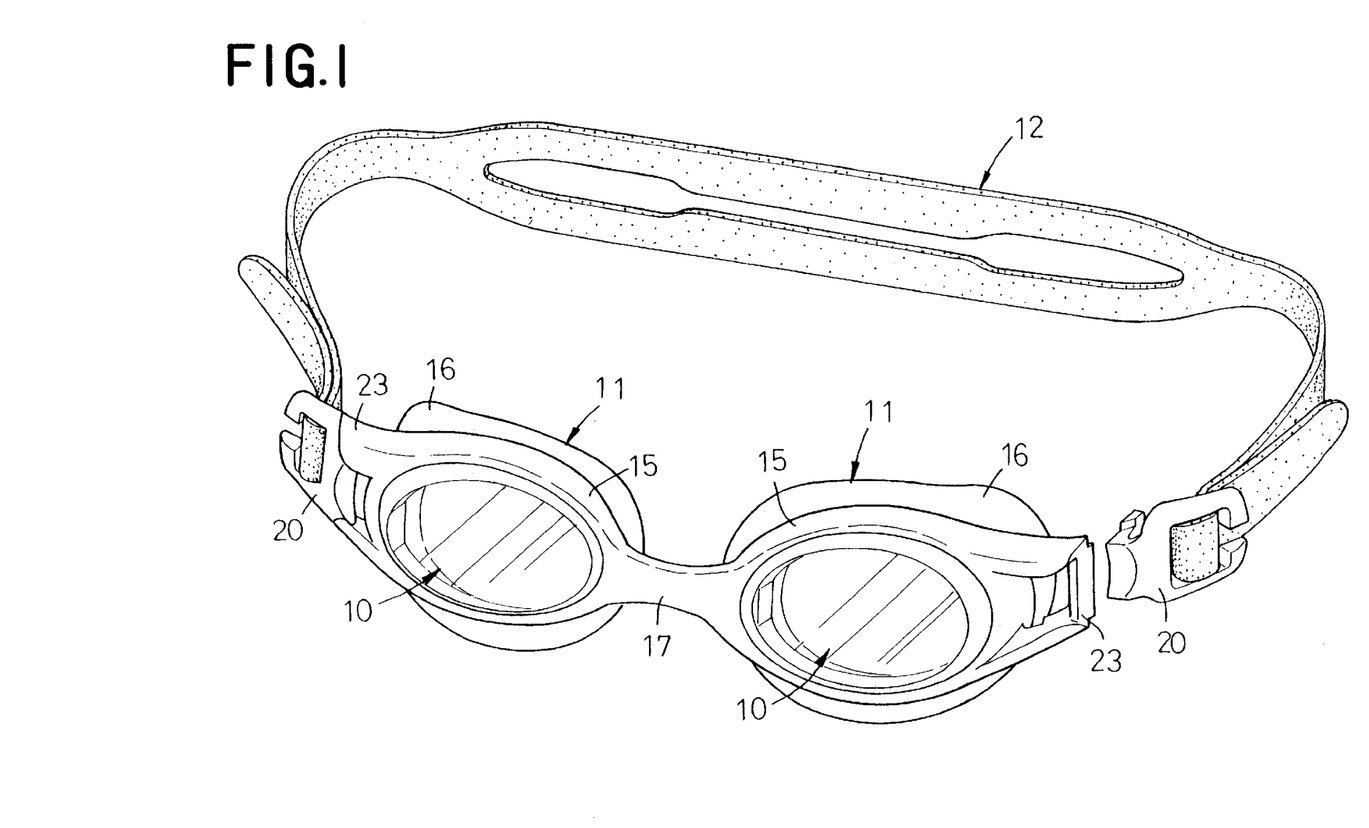
FIG. 1 is a perspective view showing swimming goggles according to a first embodiment of this invention with a buckle on one side disengaged from the adjacent lens frame.
Figure 2:
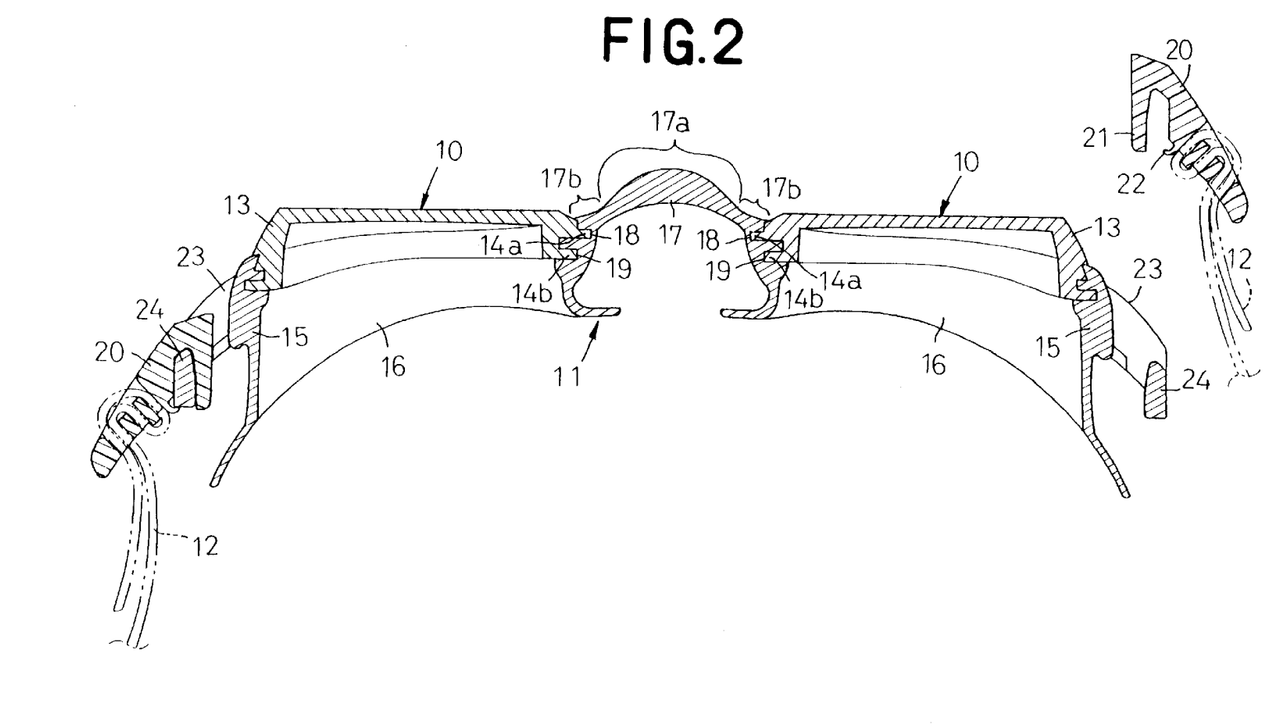
FIG. 2 is a sectional view cut along a horizontal plane passing through a bridge of the goggles shown in FIG. 1.

FIGS. 1 and 2 show a first embodiment of this invention. Referring to FIGS. 1 and 2, the goggles comprise a pair of lenses 10, a pair of lens frames 11 and a head strap 12.

The lens 10 is made of a hard and transparent material such as plastics or shock-resistant glass in a so-called cup-shape and has a peripheral wall 13 and a pair of ribs 14a, 14b circumferentially extending in parallel to and spaced from each other along outer peripheral surface of the peripheral wall 13.

Each of the lens frames 11 is made of rubber or plastic elastomer and has an annular lens holder 15 adapted to hold the associated lens 10, a gasket skirt 16 extending from rear edge of the associated lens holder 15 and a bridge 17 extending between the lens holders 15 opposed to and spaced from each other so as to connect these lens holders 15 together. Each of the lens holders 15 is formed in its inner peripheral surface with grooves 18, 19 adapted to be water-tightly engaged with the ribs 14a, 14b of the associated lens 10, respectively. Each of the gasket skirts 16 has a sufficient size and flexibility to be placed against regions surrounding the wearer' eyes.

The head strap 12 is made of a flexible material such as rubber, plastic elastomer or elastically stretchable synthetic fiber and longitudinally opposite end portions of the head strap 12 are length-adjustably inserted through respective buckles 20. The buckle 20 has a pair of locking pawls 21, 22.

Each of the lens frames 11 includes an arm 23 extending from outer side of the lens frame 11 which has, in turn, an interlocking portion 24. The interlocking portion 24 of the arm 23 may be detachably interlocked with the locking pawls 21, 22 of the buckle 20 to connect the buckle 20 to the associated arm 23.

The bridge 17 curves forward with respect to the wearer's face to describe a substantially circular arc and comprises an intermediate region 17a having a given length defined between the pair of lens holders 15 and opposite end regions 17b each having a given length defined between the intermediate region 17a and the respective lens holders 15. Flexibility of the bridge 17 is lower in the intermediate region 17a than in the opposite end regions 17b. Depending on cross-sectional shape and/or area of the bridge 17, the length of the intermediate region 17a is preferably dimensioned to be in a range of $3/10$–$8/10$ of the full length of the bridge 17. Specifically to describe about the flexibility of the bridge 17, this flexibility defines a gradient such that the flexibility gradually increases from the longitudinally middle zone of the bridge 17 bisecting its full length toward the respective lens holders 15. Such gradient in flexibility is obtained by designing the cross-sectional shape and/or area of the bridge to be gradually reduced from the middle zone of the bridge 17 toward the respective lens holders 15.

Figure 7A:
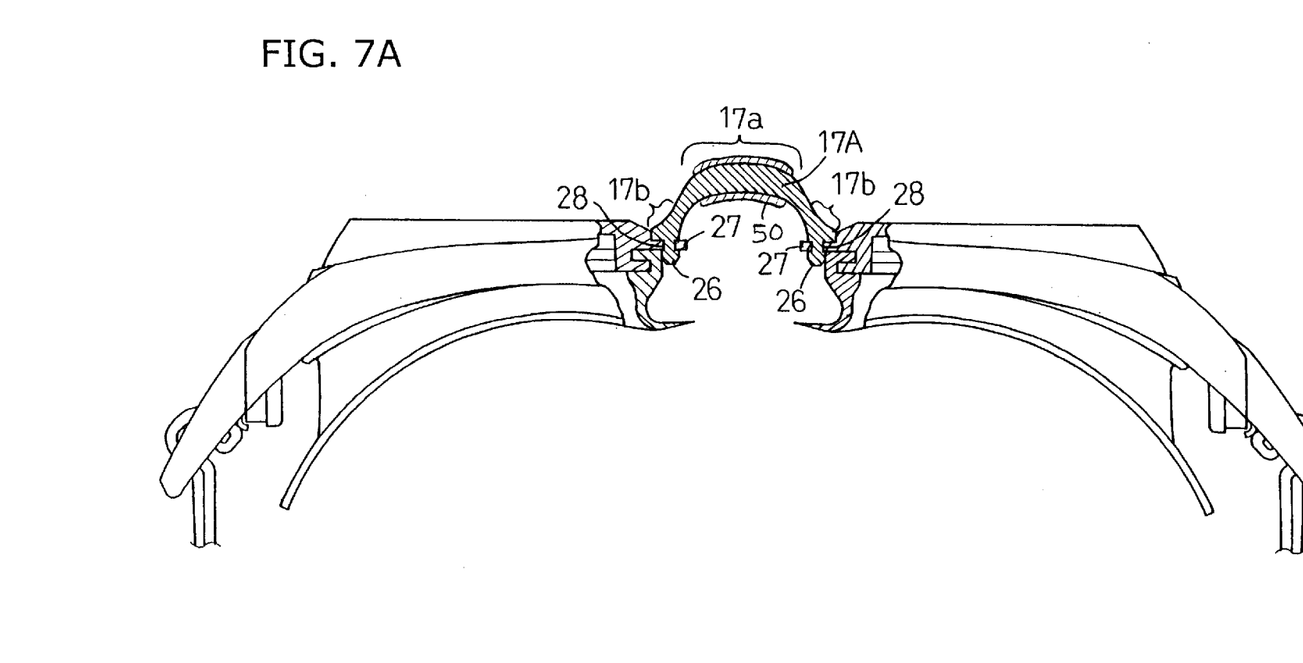
FIG. 7A shows a sectional view cut similar to FIG. 5 but with a collar around the bridge.
Figure 7B:
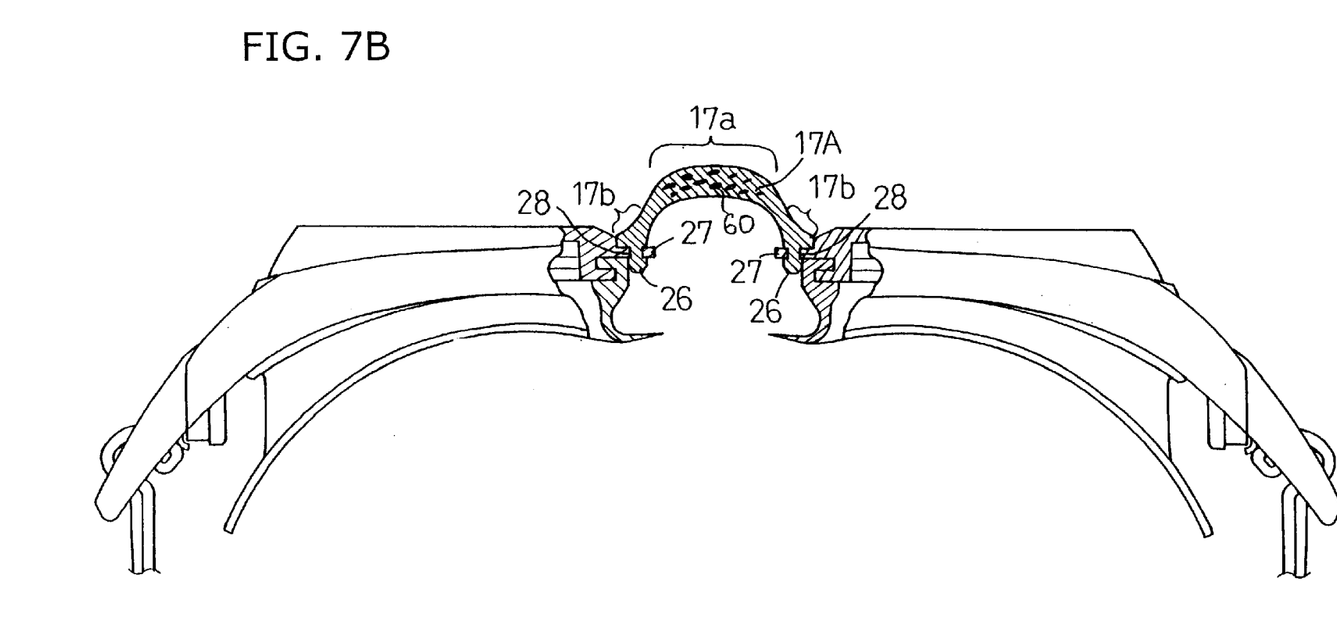
FIG. 7B shows a sectional view cut similar to FIG. 5 but with a metallic material embedded in the bridge.

From a viewpoint of convenience for molding the bridge 17, the desired flexibility is preferably obtained by designing the cross-sectional shape and/or area thereof as has been described above. However, there are other various means to provide the bridge 17 with the desired flexibility. For example, the cross-sectional shape and/or area of the bridge 17 may be uniformly designed over its full length inclusive of the intermediate region 17a as well as the opposite end regions 17b and the intermediate region 17a may be integrally covered with a collar made of an appropriate material having a relatively low flexibility, see FIG. 7A which is similar to FIG. 5 but includes a collar 50. Alternatively, appropriate metallic material may be embedded in the intermediate region 17a, see FIG. 7B which shows metallic material 60 embedded in intermediate region 17a. The means also enable the intermediate region 17a to have its flexibility lower than that in the opposite end regions 17b.

Figure 3:
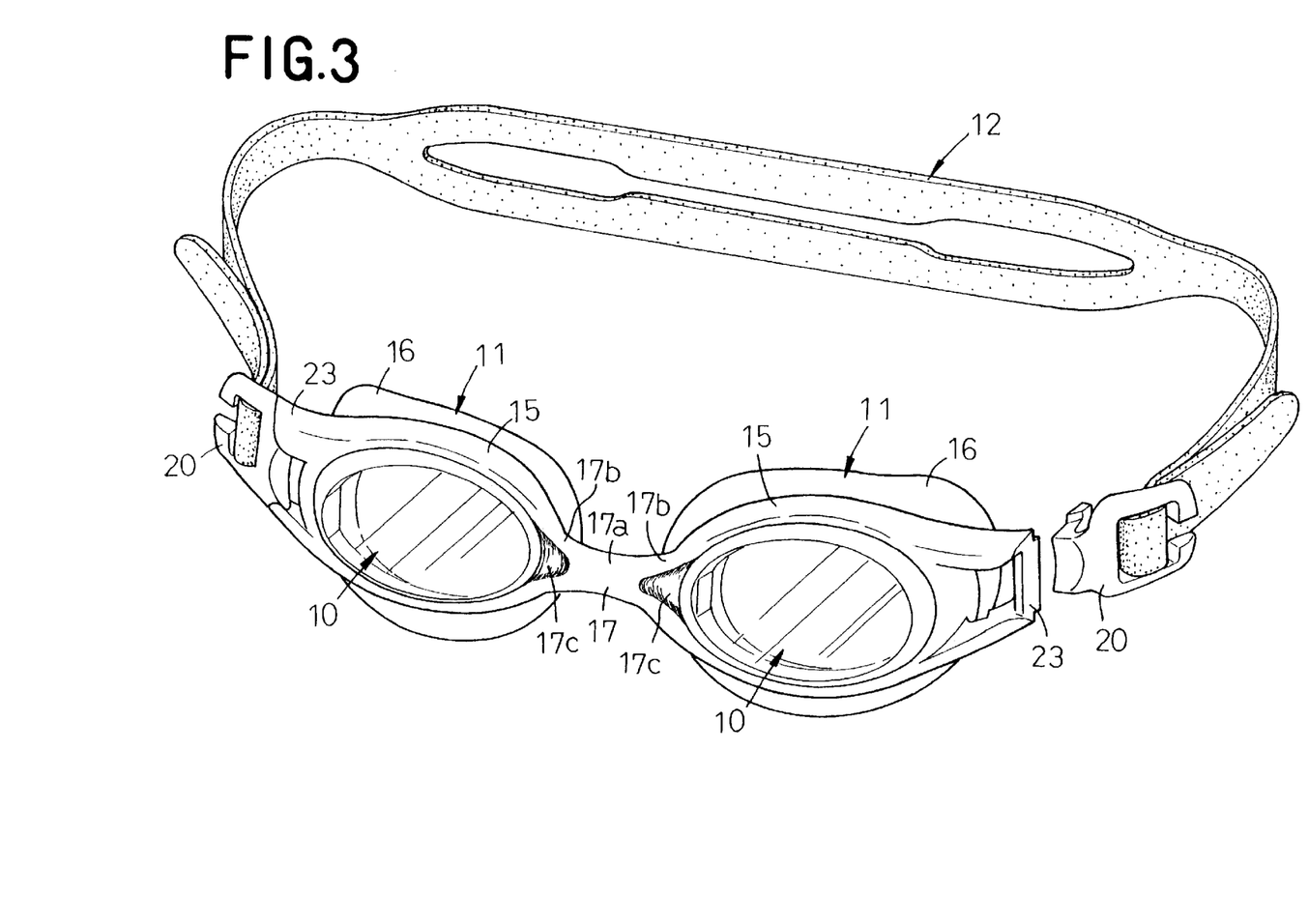
FIG. 3 is a view similar to FIG. 1 but showing swimming goggles according to a second embodiment of this invention.

FIG. 3 shows a second embodiment of this invention similar to the first embodiment shown in FIGS. 1 and 2 except that the bridge 17 is formed on its opposite end regions 17b with substantially triangular concave regions 17c. These concave regions 17c are formed so as to leave upper and lower edges of the respective end regions 17b intact so that the opposite end regions 17b may have the desired strength and flexibility.

Figure 4:
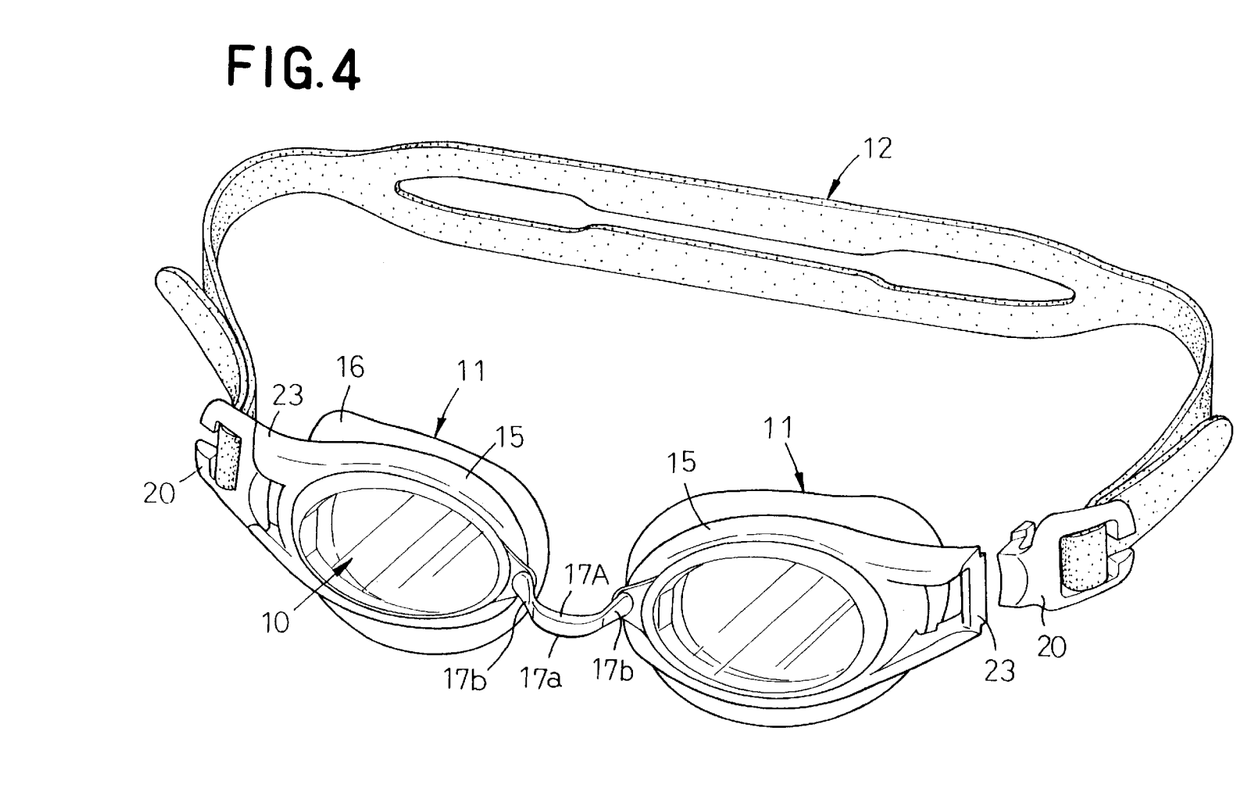
FIG. 4 is a view similar to FIG. 1 but showing swimming goggles according to a third embodiment of this invention.
Figure 5:
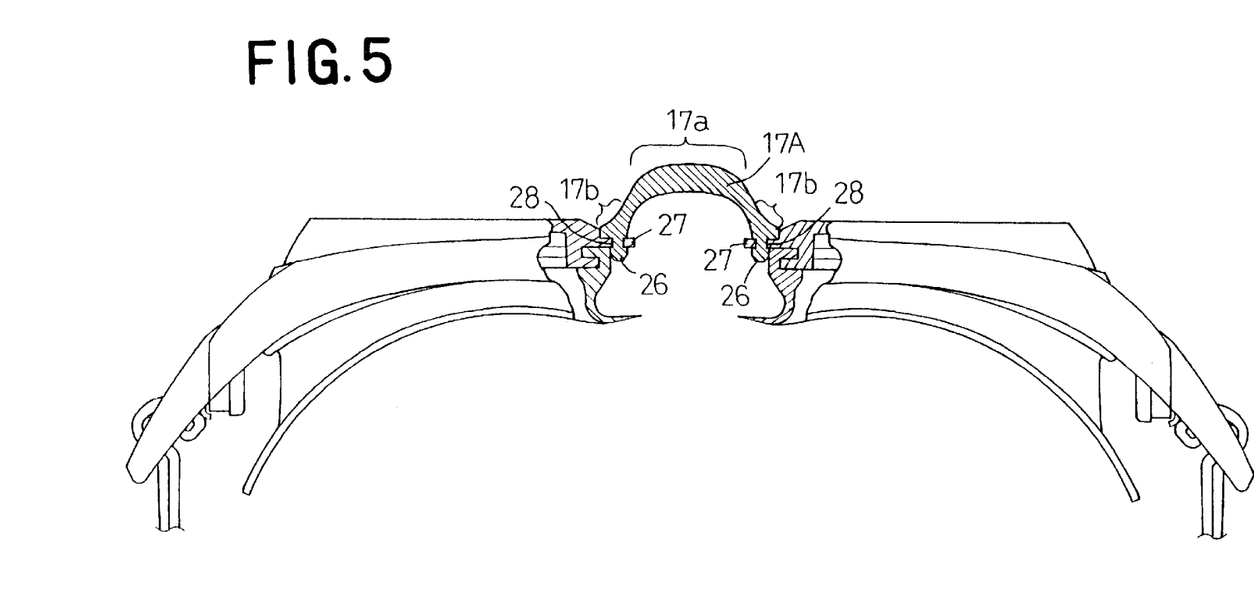
FIG. 5 is a sectional view cut along a horizontal plane passing through a bridge of the goggles shown in FIG. 4.

FIGS. 4 and 5 show a third embodiment of this invention. This embodiment is similar to the first embodiment of this invention shown in FIGS. 1 and 2 except that a bridge 17A is made of a flexible material prepared separately from the material for the pair of lens frames 11.

According to this third embodiment, locking projections 26 formed at longitudinally opposite ends of the bridge 17A may be inserted into guide holes 28 of respective connectors 27 extending inward from opposite ends of the respective lens holders 15 against elasticity of the connectors 27 to engage the locking projections 26 with the connectors 27.

The swimming goggles according to this invention primarily characterized in the bridge 17, 17A as has been described above with respective embodiments offer such effects: The intermediate region 17a of the bridge 17, 17A less flexible than the remaining region stably retains its initial shape of curve with a given self-shape retaining property even during use of the goggles, on one hand, and the opposite end regions 17b of the bridge 17, 17A having relatively high flexibility are appropriately deformed in conformity with a contour of the face of the individual wearer, on the other hand; and, in this way, the swimming goggles can be stably retained in conformity with a contour of the face which largely varies with the individual wearer.

What is claimed is:

1. Swimming goggles comprising:
    a pair of lenses;
    a pair of lens frames being more soft and flexible than said pair of lenses;
    said lens frames including annular lens holders to hold said lenses and gasket skirts extending from rear edges of said lens holders, and further comprising a connector member extending between said lens holders to connect said lens holders to each other; and
    said connector member being provided in a form of a bridge extending between the opposite inner ends of said lens holders wherein said bridge has an intermediate regions extending between said opposite inner ends and end regions defined and extending between said intermediate region and each of said inner ends and said bridge has a flexibility lower in said intermediate region than in said end regions;
    wherein said bridge has a gradient in flexibility increasing gradually from a middle zone of said bridge bisecting the length of said bridge toward each of said inner ends.

2. The swimming goggles according to claim 1, wherein said gradient in flexibility of said bridge is defined by a cross-sectional shape and/or a cross-sectional area of said bridge.

3. The swimming goggles according to claim 1, wherein said bridge is curved in a convexed shape to the front of a goggles wearer's face.

4. The swimming goggles according to claim 1, wherein said bridge is formed integrally with said lens frames using the same flexible material as the material of said lens frames.

5. The swimming goggles according to claim 1, wherein said bridge is formed by a flexible material different from the material for said lens holders and coupled at opposite ends of said bridge to said lens holders.

6. The swimming goggles according to claim 1, wherein said lens frames inclusive of said bridge are formed by rubber or plastic elastomer.

7. The swimming goggles according to claim 1, wherein each of said lens is formed in a shape of a cup provided on its peripheral walls with at least one rib, on one hand, and each of said lens holders is provided on its inner peripheral wall with a groove so that said rib may be water-tightly engaged with said groove.

8. The swimming goggles according to claim 1, wherein said intermediate region is integrally covered with a collar.

9. The swimming goggles according to claim 1, wherein said intermediate region is embedded with a metallic material.

* * * * *